Nov. 17, 1942.  P. J. MOCHEL  2,302,044
REFRIGERATING APPARATUS
Filed May 28, 1941  3 Sheets-Sheet 1
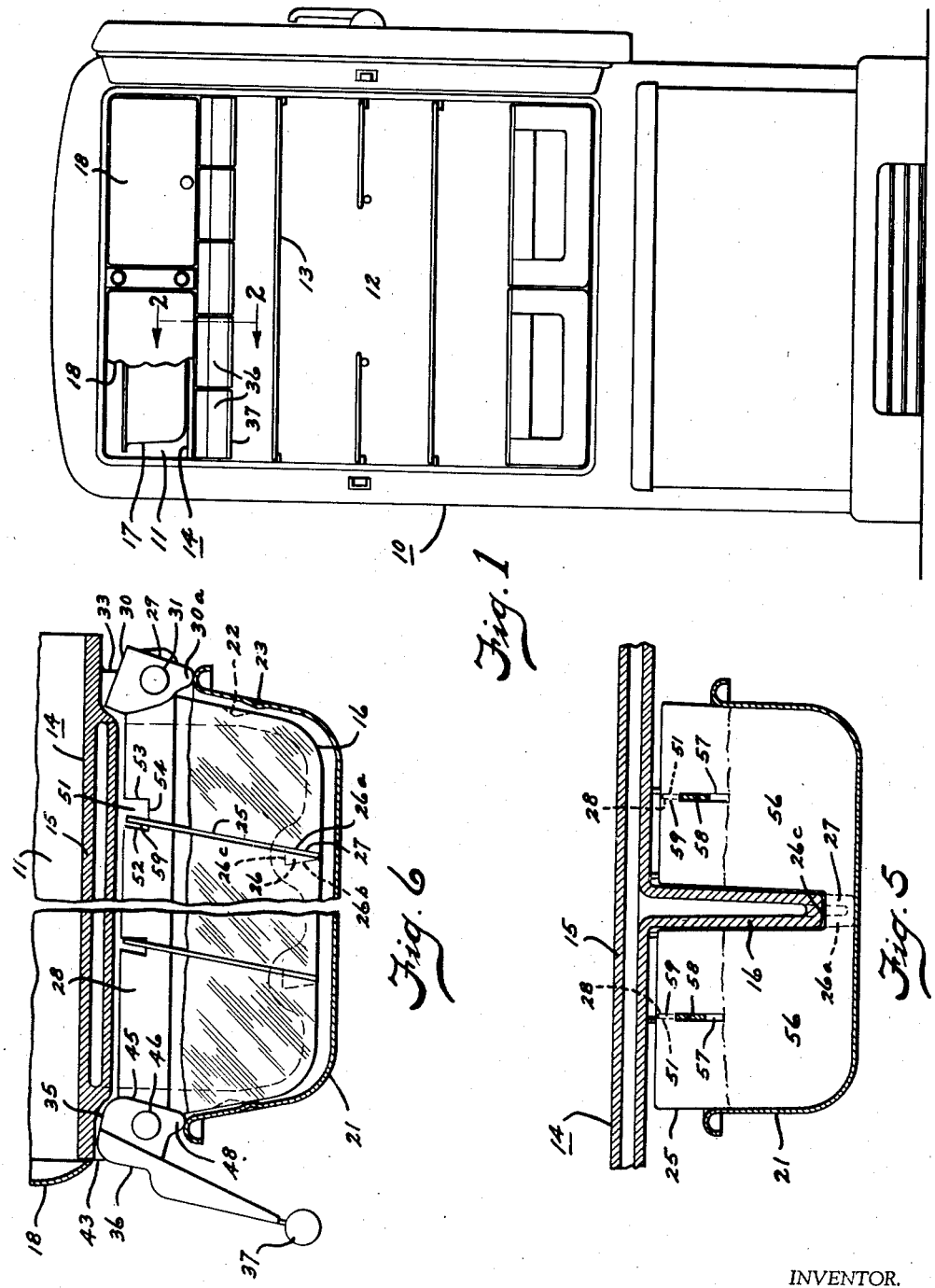
INVENTOR.
PAUL J. MOCHEL.
BY
Spencer, Hardman and Fehr.

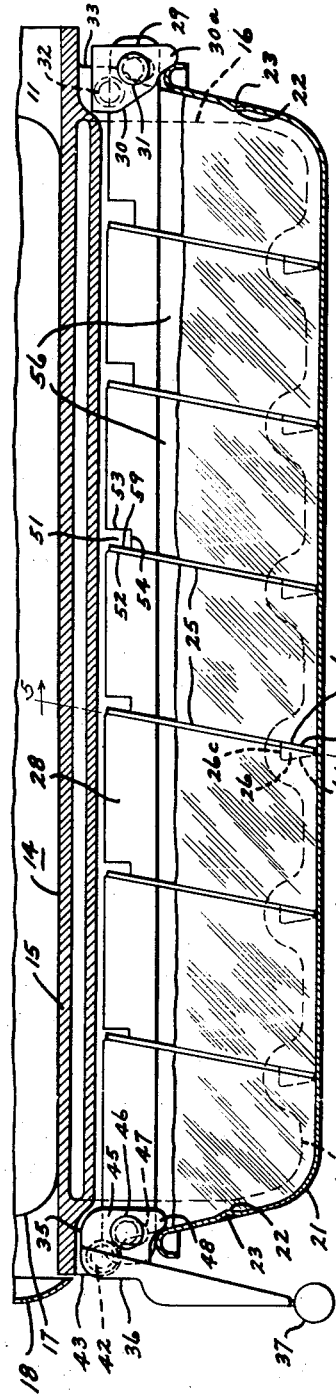
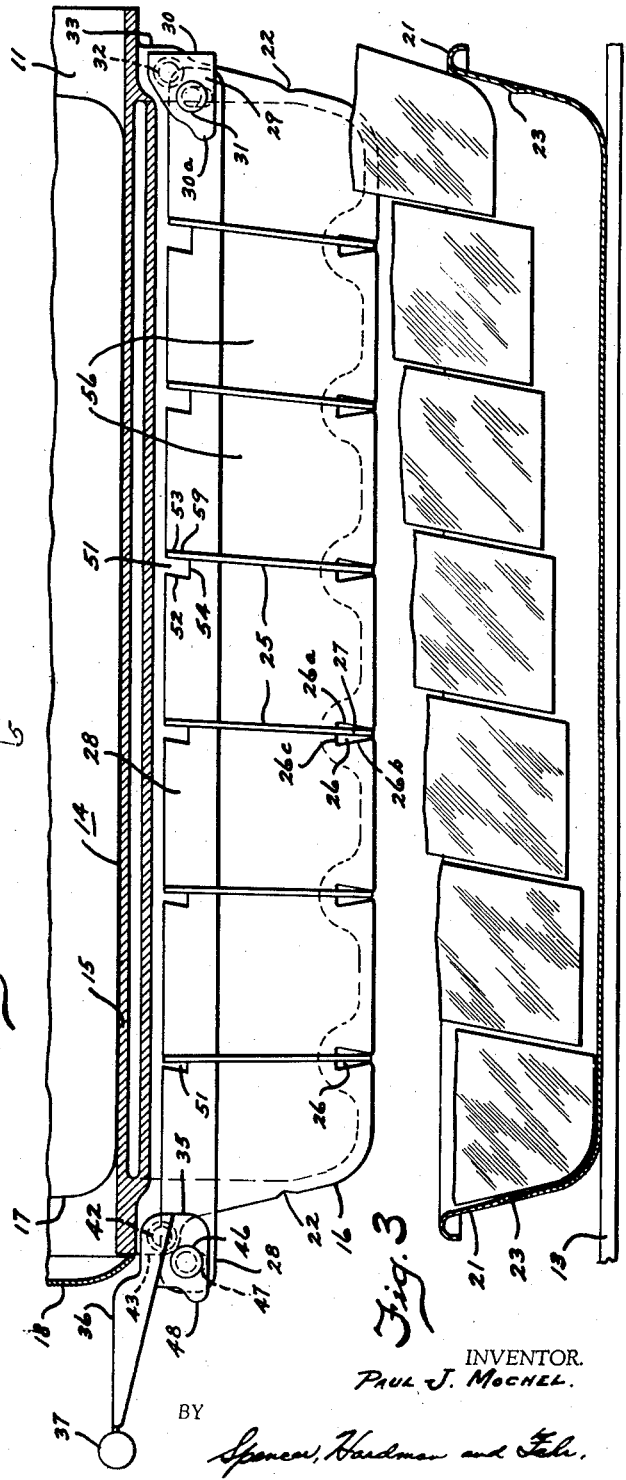

Nov. 17, 1942. P. J. MOCHEL 2,302,044
REFRIGERATING APPARATUS
Filed May 28, 1941 3 Sheets-Sheet 3

INVENTOR.
PAUL J. MOCHEL.
BY
Spencer, Hardman and Fish

Patented Nov. 17, 1942

2,302,044

UNITED STATES PATENT OFFICE 2,302,044

REFRIGERATING APPARATUS

Paul J. Mochel, Detroit, Mich., assignor to General Motors Corporation, Dayton, Ohio, a corporation of Delaware Application May 28, 1941, Serial No. 395,646

9 Claims. (Cl. 62—108.5)

This invention relates to refrigeration and particularly to apparatus for freezing small ice blocks for table use.

An object of my invention is to provide an improved apparatus for rapidly freezing water into ice blocks and for conveniently harvesting or releasing the ice blocks from the mold or apparatus in which they have been frozen.

Another object of my invention is to provide a freezing apparatus wherein a grid is in intimate thermal contact with or has a portion thereof formed as an integral part of a heat absorber or evaporator and wherein a tray containing water is elevated and held in cooperative association with the grid during freezing of the water with improved means for breaking the bond between ice blocks and walls of the tray and grid.

It is a further object of my invention to provide in a freezing apparatus, of the type described in the preceding object, manually actuated mechanical means for moving the tray downwardly of the stationary grid to break the bond between ice blocks and walls of the tray and for thereafter breaking the bond between ice blocks and walls of the grid.

In carrying out the foregoing objects, it is a still further and more specific object of my invention to release ice blocks from a freezing apparatus of the type described by mechanically moving the tray away from a grid and thereafter moving certain of the grid walls relative to others and to one another to mechanically break the bond between ice blocks and the grid.

Further objects and advantages of the present invention will be apparent from the following description, reference being had to the accompanying drawings, wherein a preferred form of the present invention is clearly shown.

In the drawings:

Fig. 1 is a front view of a refrigerator cabinet having my improved freezing apparatus therein and showing the food storage compartment door in open position;

Fig. 2 is an enlarged sectional view of the freezing apparatus taken on the line 2—2 of Fig. 1, showing the apparatus in a normal freezing position;

Fig. 3 is a view similar to Fig. 2 showing the tray removed from the apparatus and grid walls thereof moved to release ice blocks therefrom;

Fig. 5 is a transverse sectional view taken on the line 5—5 of Fig. 2 showing the interlocking of movable walls of the apparatus to a stationary wall thereof; and Fig. 6 is a fragmentary view of the apparatus showing the initial movement of the lever thereof to break the tray therefrom.

Figure 4:
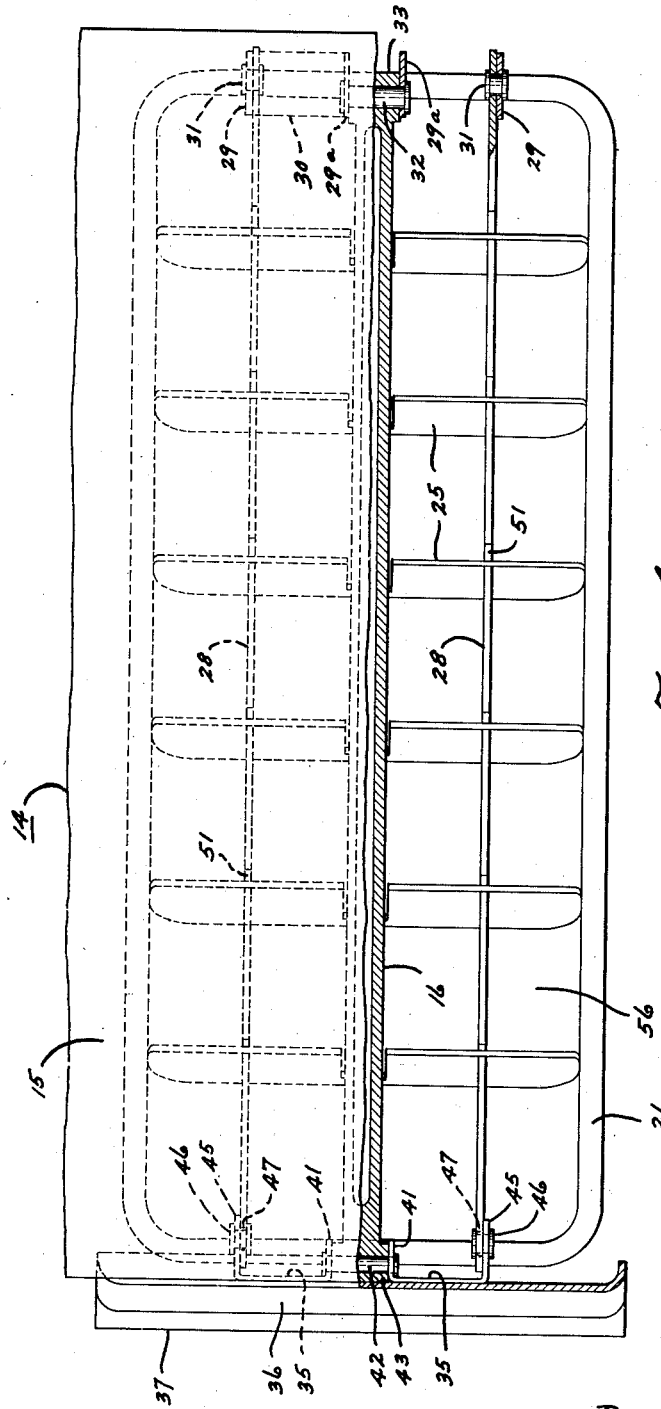
Fig. 4 is a top fragmentary view of the freezing apparatus shown partly in section and partly in elevation.

Referring to the drawings, and particularly to Fig. 1 thereof, I show a household refrigerating apparatus comprising a cabinet 10 having an insulated food storage chamber formed in the upper part thereof and a refrigerant translating unit containing compartment in the lower part thereof. A heat absorber or evaporator is mounted in any suitable or desirable manner within the food storage chamber for cooling the interior thereof and for dividing this chamber into an upper compartment 11 and a lower compartment 12. The interior of the lower food storage compartment 12 may be divided into a plurality of food supporting surfaces or areas by suitably arranged and horizontally disposed shelves 13. The heat absorber or evaporator, is generally represented by the reference character 14 and comprises a flat hollow portion 15 which extends entirely across the cabinet chamber and integral hollow horizontally spaced apart fins or walls 16 depending from the portion 15 thereof. Hollow portions 15 and 16 of the heat absorber form refrigerant evaporating passage-ways and the evaporator is provided with inlet and outlet connections (not shown) to which refrigerant pipes or conduits are secured for conveying a refrigerating fluid, circulated by the refrigerant translating unit, to and from the evaporator 14 as is conventional. The top surface of heat absorber or evaporator 14 forms a support for large receptacles 17 adapted to contain meat, fish, berries or other frozen food products. A door or doors 18 close the front of upper compartment 11 to conceal the receptacles 17.

Each of the plurality of horizontally spaced apart fins 16 depending from the flat portion 15 of absorber or evaporator 14 may be tapered and forms a refrigerated longitudinal wall for a grid adapted to have a tray associated therewith in a manner to be presently described. The grid is stationary with respect to the evaporator and as distinguished from grids that are removable along with a tray from an evaporator. The provision of a tray and grid within cabinet 10 is for the purpose of providing the user of the refrigerator with a freezing apparatus adapted to freeze water into small cubes or blocks for table use and this practice has now become essential in the sale and use of refrigerators. Therefore, in the present disclosure each refrigerated fin 16 is provided with means for receiving a portion of a tray 21 and for holding and removably maintaining the tray, containing water to be frozen, in cooperative relation with the fin. For example, the front and back walls of fin 16 are each provided with a small recess 22 (see Fig. 2) and a boss formed by a depression in the front and back wall of tray 21 fits into the recesses 22 to hold the tray 21 in cooperative relation with the grid. Each hollow refrigerated fin 16, of evaporator or absorber 14 has a plurality of substantially inflexible metal walls 25 movably associated therewith to form with fin 16 a longitudinal wall and a plurality of transverse walls of a grid. Grid walls 16 and 25 depend into the tray 21 and divide the interior thereof into a plurality of ice block forming compartments. Fin or longitudinal grid wall 16 is provided with a plurality of spaced apart notches 26 along its bottom edge and a web part 27 of walls 25 fit into these notches (see Fig. 5). The cut out part of each wall 25 adjacent and above the web 27 receives or straddles the grid wall 16. The notches 26 include side walls 26a and 26b disposed or formed at opposite angles to one another and have a horizontal wall 26c (see Fig. 3). A longitudinally extending bar 28 is disposed at each side of wall 16. The back end of each of these bars 28 is connected to one leg 29 of U-shaped link members 30 and the other leg 29a of members 30 is pivotally connected by a pin 32 to a boss 33 depending from the back edge of portion 15 of evaporator 14. The leg 29 of each link 30 is provided with a depending cam portion 30a for a purpose to be hereinafter described. At the front end of the grid, formed by walls 16 and 25, there is a pair of substantially U-shaped link members 35 welded or otherwise suitably secured to a lever 36. This lever 36 extends entirely across the front of the grid and tray 21 (see Fig. 1) and includes a handle end in the form of a rod 37 secured thereto. Lever 36 and its handle end or rod 37 conceals the grid and tray and also forms a part of the decorative interior of the refrigerator cabinet. One leg 41 of each U-shaped link 35 is pivotally secured by a pin or rivet 42 to a boss 43 depending from the front edge of portion 15 of evaporator 14 (see Fig. 4). The mounting of link members 35 upon the boss 43 pivotally secures lever 36 to the evaporator 14. The other leg 45 of each link 35 has a pin or rivet 46 secured thereto and these pins or rivets 46 extend through a vertically elongated opening 47 provided in the front end portion of each bar 28. It is to be noted that the vertical elongation of opening 47 corresponds to the elongation of the openings provided in the back portion of bars 28 which receive the pins 31 and which openings permit an initial movement of lever 36 for a purpose to be hereinafter described. Each leg part 45 of the U-shaped link member 35 is provided with a depending cam portion 48 for a purpose to be hereinafter described. The bars 28 are each provided with a plurality of horizontally spaced apart slots or notches 51, extending downwardly from their top edges. These notches 51 include side walls 52 and 53 and a horizontal wall 54. Notches 26 and 51 provided in wall 16 and bar members 28, respectively, cooperate with one another to movably hold the walls 25 in a transverse position with respect to wall 16 so as to provide ice block forming compartments 56 or so as to divide the interior of tray 21 into a plurality of cells. For example, an opening 57 provided in each transverse grid wall 25 receives a web part 58 of bar member 28 (see Fig. 5) so that second web parts 59 provided in walls 25 fit into the notches 51. Thus the transverse walls 25 are carried by the two bars 28 which bars are in turn carried by the heat absorber or evaporator 14. It will be noted that the slots and notches 26 and 51 are arranged to normally hold the web portions 27 or transverse partitions 25 against the wall portion 26a of each of the notches 26. This abutment of walls 25 with wall portion 26a, of the notches 26, normally maintains the members 25 in parallel relation to one another and in a predetermined inclined position disposed at an acute angle with respect to the vertical. This normal angled position of the transverse grid walls 25 provides the ice block compartment 56 with a parallelogram shape in one direction of cross section therethrough which facilitates release of ice blocks from the grid in a manner to be presently described.

Notches 51 in bar members 28 are of such configuration and of progressively increased width relative to one another from the lever end of the apparatus to the back end thereof as to cause the bars 28, upon being moved lengthwise toward the front of the apparatus by lever 36, to successively engage and move or tilt the transverse walls 25 to produce progressive tilting thereof along the length of the structure. In the present device initial movement of lever 36 upwardly about its pivotal mounting 42 causes the pins or rivets 46 to move downwardly in the vertically elongated opening 47 of bars 28 without moving the transverse grid walls. Thus this initial movement of lever 36 may be utilized to cause the cams 30a and 48 of links 30 and 35, respectively, to engage the top rim portion of tray 21 and force the tray downwardly of the grid prior to moving any of the movable grid walls.

In the use of the freezing apparatus disclosed a tray 21 is partially filled with water and elevated into cooperative relation with the grid so that the grid walls 16 and 25 depending from evaporator 14 extend into and divide the interior of the tray into two rows of ice block forming compartments 56. Upon movement of tray 21 upwardly into the position relative to the grid walls as described, the boss 23 on the front and rear walls of the tray rides over the end surfaces of fin or wall 16 until they become aligned with the recesses 22 whereupon these bosses move or snap into the recesses 22. Therefore, this arrangement serves as means for holding the tray of water into the proper cooperative relation with the grid walls. Thus tray 21 is maintained in the cooperative relation with the grid, as shown in Fig. 2 of the drawings, during freezing of the water into ice blocks by the refrigerating effect produced by refrigerant evaporating within the heat absorber or evaporator 14 and particularly by evaporation of refrigerant within the passageway formed by the hollow fin or grid wall 16. After the ice blocks are formed they may be harvested from the freezing apparatus by manual movement of a lever in a single direction of motion. Movement of lever 36, by grasping the handle end 37 thereof, simultaneously rotates the link members 30 and 35, through a short initial lengthwise movement of bars 28, about their mounting pins 32 and 42, respectively, and causes engagement of the cams 30a and 48 with the rim of tray 21. Force now applied to lever 36 is directed to the cams 48 and is transmitted to the cams 30a through bars 28, and these cams push downwardly on the rim of tray 21 to spring the end walls of the tray outwardly and force the tray bosses 23 out of engagement with the recesses 22 provided in the grid wall 16. This movement of tray 21 through the force multiplying manually actuated mechanism breaks the ice bond between walls of the tray and ice blocks within the compartments of the grid (see Fig. 6). The tray falls upon the shelf 13 within compartment 12 of cabinet 10 in a position directly below the grid walls 16 and 25. Continued upward movement of lever 36 about its pivotal mounting 42 causes the pins 46 to engage the side wall of openings 47, provided in bars 28, and apply force to bars 28 to further simultaneously move the same lengthwise of the apparatus and toward the front thereof. The walls 53, of notches 51, adjacent the lever end of the apparatus then engages web parts 59 of the first transverse grid wall 25 to tilt the same toward the vertical. Further upward movement of lever 36 causes the walls 52 of other of the notches 51 to sequentially engage and tilt other of the transverse grid walls 25. Grid walls 25 are thereby moved or tilted in succession and when tilted from their inclined position toward the vertical, the cross sectional area shape or contour of the compartments 56 are progressively changed and this change momentarily enlarges each compartment. Movement of the transverse walls 25 breaks the bond between ice blocks in compartments 56 and the grid walls and when the compartments are enlarged in the manner described, the ice blocks fall out of the compartments into the tray 21 (see Fig. 3). The lever 36 and its associated parts are preferably of such weight as to cause, when the lever is released, movement of all the parts of the mechanism back into their normal positions. Movement of bars 28 to the right as viewed in the drawings, causes the walls 52 of notches 51 to engage and return the transverse grid walls to their normal inclined position against the wall 26a of notches 26 since the transverse walls 25 pivot about the lower end of the notches 26 during tilting movement thereof.

From the foregoing, it will be apparent that I have provided an improved freezing apparatus for a refrigerator cabinet which is strong and durable and capable of being operated with a minimum of force to effectively remove ice blocks therefrom without interrupting or altering the operation of the refrigerant translating or compressing and liquefying unit associated with the refrigerator. My improved structure eliminates the necessity of removing a grid along with a tray from the freezing compartment of an evaporator disposed within a refrigerator cabinet. In the present disclosure all and/or less than all of the ice blocks can be released from the freezer and picked out of the tray as needed. Certain of the ice blocks may be permitted to remain bonded to the grid walls while others are removed therefrom and the remaining ice blocks may be released from the grid as needed or desired. This feature is advantageous in that only a few ice blocks need be released as desired and therefore the ice blocks remaining in the grid will not be melted by the high temperature maintained within the food storage compartment. Another advantage in the present disclosure is that the arrangement more satisfactorily meets heavy demands for ice blocks in that all of the ice blocks may be removed from the series of grids and supported upon the evaporator within the upper compartment of the food chamber while other trays containing water are positioned in cooperative relation with the grid walls to freeze additional ice blocks.

While the form of embodiment of the invention as herein disclosed, constitutes a preferred form, it is to be understood that other forms might be adopted, all coming within the scope of the claims which follow.

What is claimed is as follows:

1. A freezing apparatus comprising in combination, a heat absorber, a grid in intimate thermal contact with said heat absorber, a tray adapted to contain liquid to be frozen cooperative with said grid so that walls of the grid depend into and divide the interior of said tray into a plurality of ice block forming compartments, means for holding the tray in said cooperative relation with said grid during freezing of the liquid in said compartments, and manually actuated means for moving said tray relative to said grid to break the bond between walls of the tray and ice blocks in said compartments, said manually actuated means including means for applying force to said ice blocks to cause the blocks to be released from walls of said grid.

2. A freezing apparatus comprising in combination, a heat absorber, a grid in intimate thermal contact with and depending from said heat absorber, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and manually actuated means for moving said tray downwardly of said grid to break the bond between walls of the tray and ice blocks in said compartments and for applying force to said ice blocks to release same from walls of said grid.

3. A freezing apparatus comprising in combination, a heat absorber, a grid in intimate thermal contact with and depending from said heat absorber, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and manually actuated means for applying force to ice blocks in said compartments to release the ice blocks from walls of said grid.

4. A freezing apparatus comprising in combination, a heat absorber, a grid in intimate thermal contact with and depending from said heat absorber, said grid including walls which are movable relative to one another, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and manually actuated means for moving said movable grid walls to break the bond between ice blocks and said grid to release the blocks from their compartments.

5. A freezing apparatus comprising in combination, a heat absorber, a grid in intimate thermal contact with and depending from said heat absorber, said grid including walls which are movable relative to one another, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and means for moving said tray downwardly of said grid to break the bond between walls of the tray and ice blocks in said compartments and for thereafter moving said movable grid walls to break the bond between ice blocks and said grid walls to release the ice blocks from said grid.

6. A freezing apparatus comprising in combination, a heat absorber, a grid in intimate thermal contact with and depending from said heat absorber, said grid including walls which are movable relative to one another, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and means movable in a single direction of motion for breaking the bond between walls of said tray and ice blocks in said compartments and for thereafter moving said movable grid walls progressively from one portion to another portion of said grid to successively break the bond between ice blocks and said grid walls to release the ice blocks from said grid.

7. A freezing apparatus comprising in combination, a heat absorber, a grid in intimate thermal contact with and depending from said heat absorber, said grid including walls which are movable relative to one another, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and means for moving said movable grid walls to break the bond between ice blocks and walls of said tray and said grid to release the ice blocks from said apparatus.

8. A freezing apparatus comprising in combination, a heat absorber, a grid positioned in intimate thermal contact with said heat absorber, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and mechanical means for moving said tray relative to said grid, while the grid is maintained in its position of intimate thermal contact with said heat absorber, to break the bond between walls of the tray and ice blocks in said compartments.

9. A freezing apparatus comprising in combination, a heat absorber, a grid positioned in intimate thermal contact with said heat absorber, a tray adapted to contain liquid to be frozen cooperating with said grid so that walls of the grid depend into and divide the interior of said tray into a plurality of ice block forming compartments, means for holding the tray in said cooperative relation with said grid during freezing of the liquid in said compartments, and means for mechanically releasing ice blocks from walls of said grid while the grid is maintained in its position of intimate thermal contact with said heat absorber.

PAUL J. MOCHEL.